United States Patent [19]
Kressly

[11] B 3,985,222
[45] Oct. 12, 1976

[54] METHOD OF FEEDING MATERIAL TO A CONVEYOR BELT

[75] Inventor: Richard H. Kressly, Red Hill, Pa.

[73] Assignee: FMC Corporation, San Jose, Calif.

[22] Filed: Apr. 21, 1975

[21] Appl. No.: 569,646

[44] Published under the second Trial Voluntary Protest Program on January 13, 1976 as document No. B 569,646.

Related U.S. Application Data

[63] Continuation-in-part of Ser. No. 391,422, Aug. 24, 1973, abandoned.

[52] U.S. Cl. .............................. 198/617; 198/606; 198/547; 198/575; 198/577; 198/824
[51] Int. Cl.² ..................................... B65G 15/00
[58] Field of Search .............. 198/1, 35, 36, 37, 40, 198/52, 53, 92, 56–58, 76, 129, 203, 208, 192

[56] References Cited
UNITED STATES PATENTS

| | | | |
|---|---|---|---|
| 2,326,098 | 8/1943 | Kimmich | 198/203 |
| 2,917,207 | 12/1959 | Prowse et al. | 198/39 X |

Primary Examiner—John J. Love
Assistant Examiner—Douglas D. Watts
Attorney, Agent, or Firm—J. F. Verhoeven; J. W. Edwards; C. E. Tripp

[57] ABSTRACT

A method of feeding material to a belt to preclude the belt from lifting off its support in vertical concave curves, both when the belt motor is driving the belt and when the belt motor is acting as a brake, is disclosed. When the belt motor is driving the belt, the material is initially fed at a reduced rate to deposit a reduced layer of material on the belt until the leading edge of the reduced layer has entered the most downstream vertical curve of the belt, at which time the rate of feed is increased. The feed rate is increased, in two or more increments, until a full load is carried by the belt. When the belt motor is acting as a brake, the feed rate is initially reduced partially, to deposit a reduced layer of material on the belt, which will remain in the most upstream vertical concave curve until the trailing edge of the full load has been discharged from the belt. Thereafter, the rate of deposit of material on the belt is diminished further, to a lower value or to zero.

4 Claims, 14 Drawing Figures

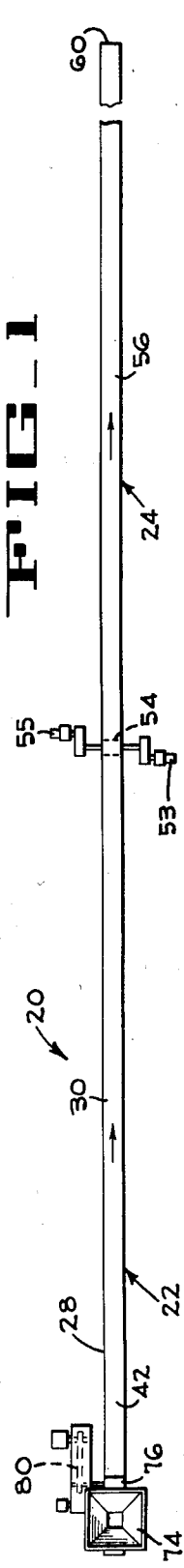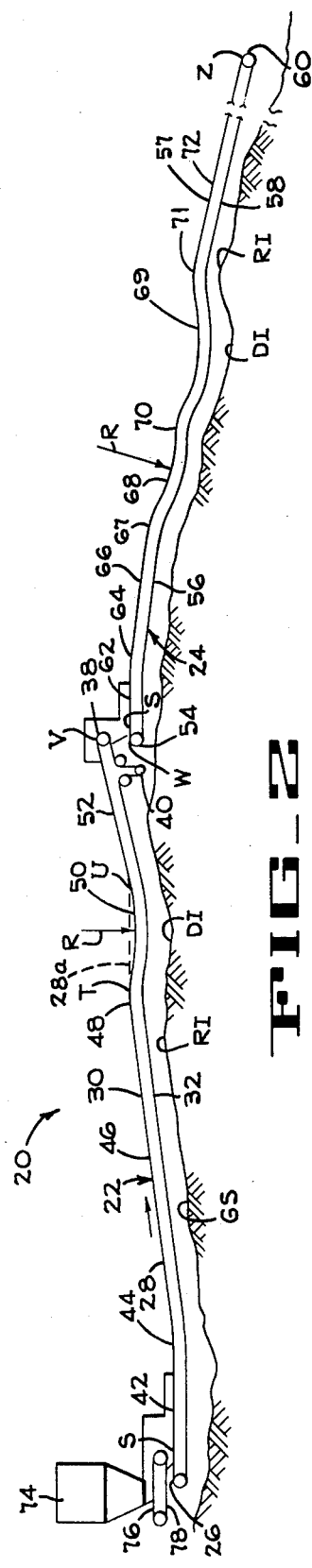

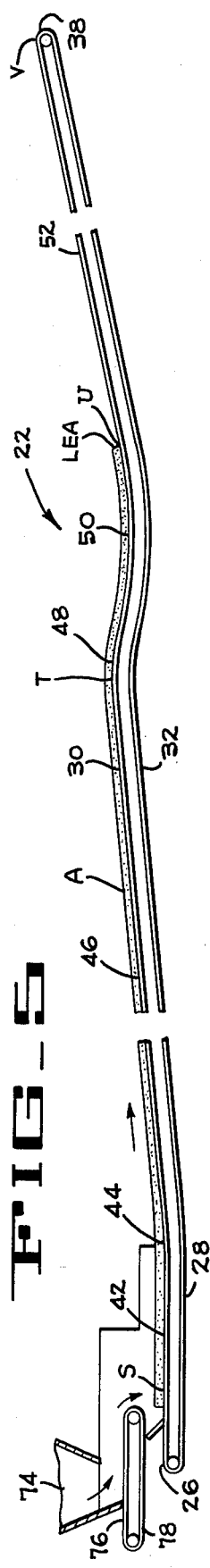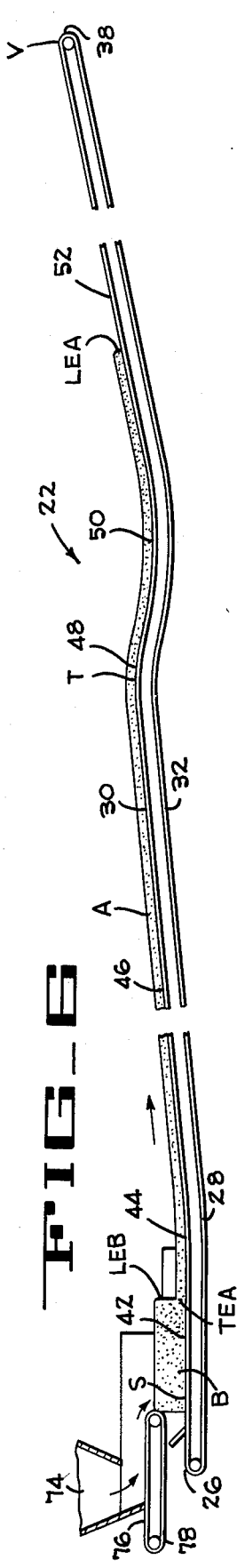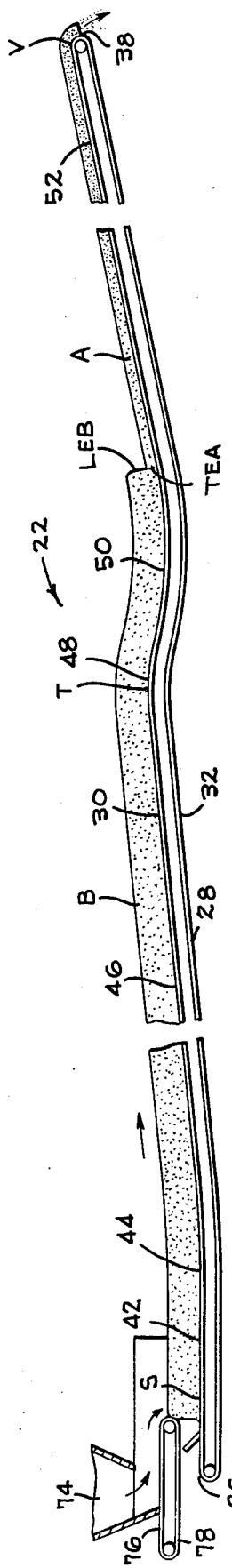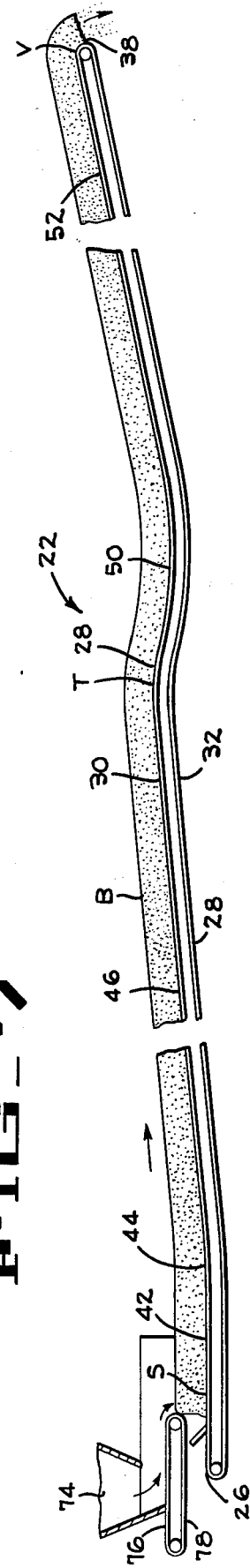
FIG_5  FIG_6  FIG_7  FIG_8

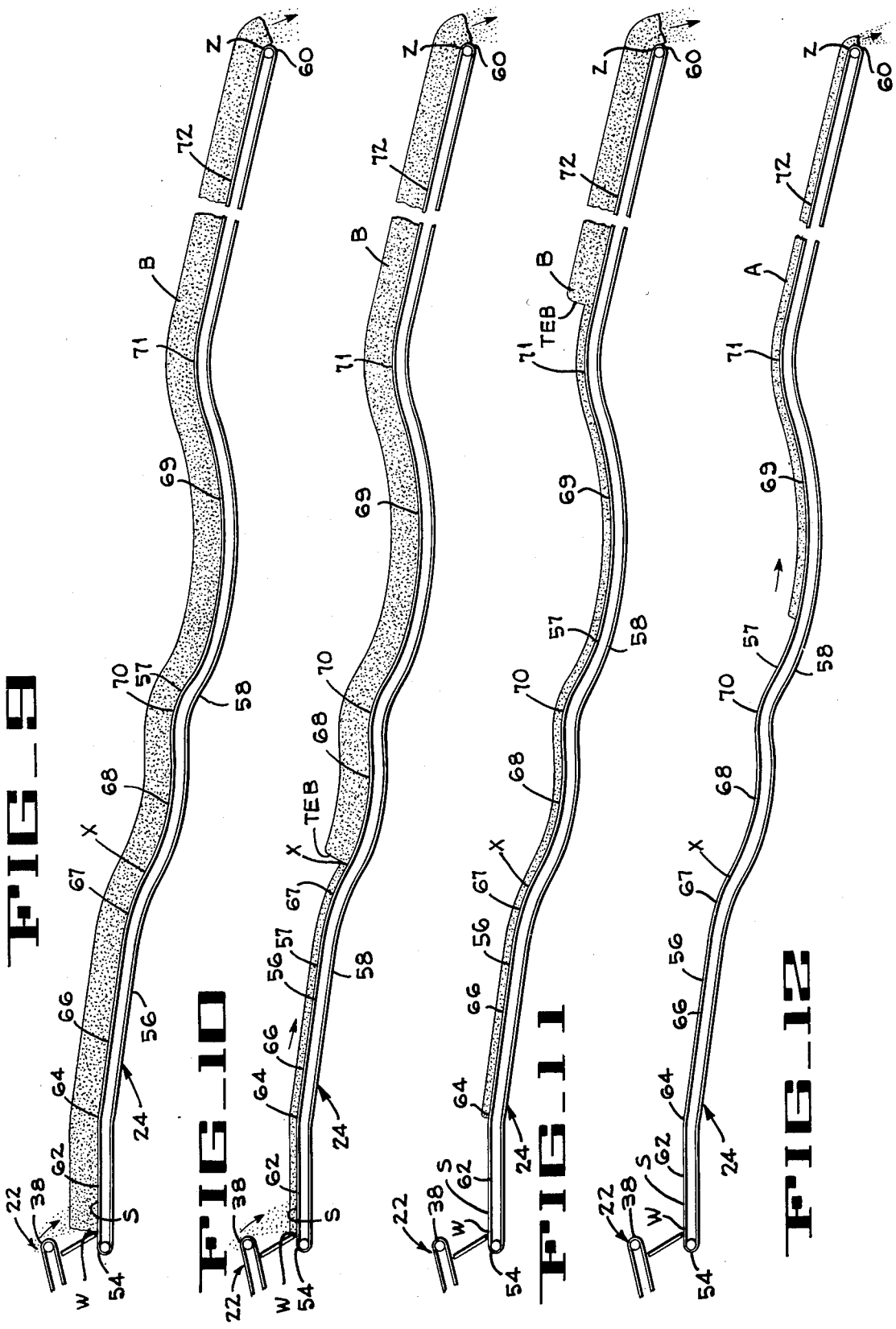

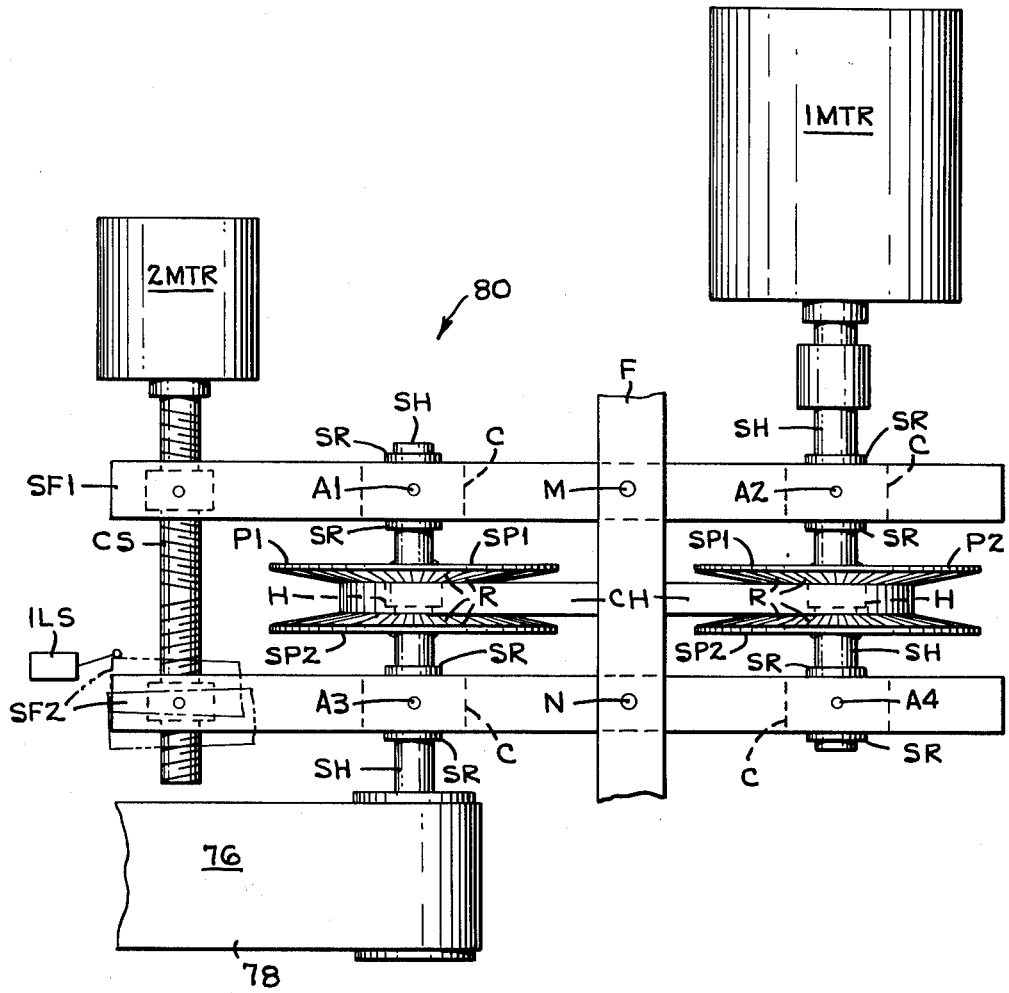
FIG_13

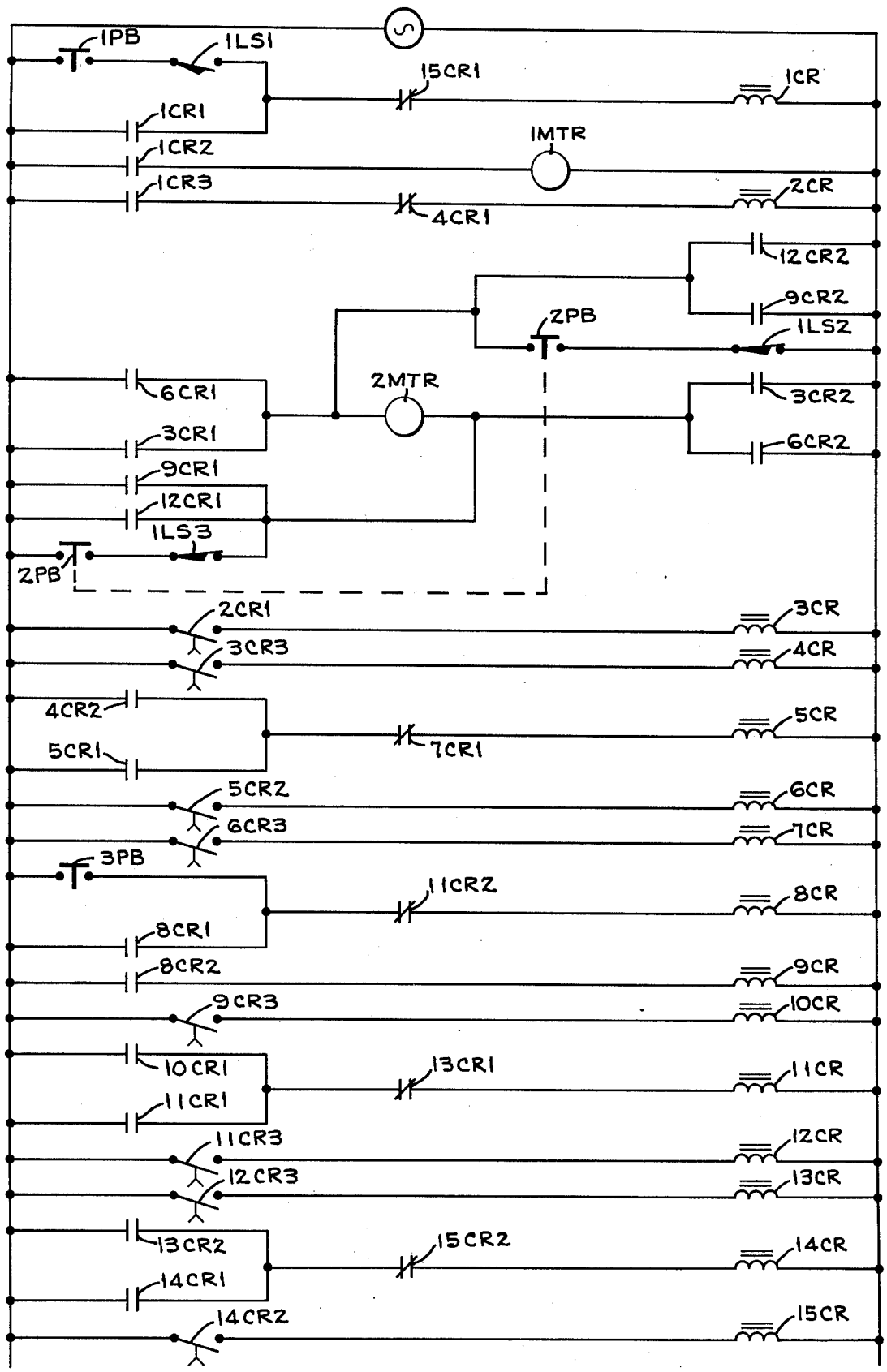
FIG_14

METHOD OF FEEDING MATERIAL TO A CONVEYOR BELT

This application is a continuation-in-part of the application of Richard H. Kressly, Ser. No. 391,422 filed Aug. 24, 1973, now abandoned.

BACKGROUND OF THE INVENTION

It frequently happens that coal, or other material, must be continuously transported overland as, for example, from a mine to a storage area, or from a storage area to a point of use. One convenient method of accomplishing this transportation is by means of an overland conveyor system. A typical overland conveyor system will consist of a series of segments in end-to-end relation stretching from the conveyor system loading, or feed, point to the final conveyor system discharge point. Each segment has an independently driven endless belt which is usually supported by idler rollers mounted on a frame resting on a ground-supported pad or other stationary support. The belts of the segments generally travel at constant, substantially equal speeds, although the belts of the segments may have to be stopped from time to time for emergency reasons such as repair. The belt of each segment (except the first and last) receives material from the adjacent upstream conveyor system segment and deposits material on the adjacent downstream conveyor system segment, so that the material deposited on the belt at the feed point of the system passes from segment to segment until it reaches the final conveyor system discharge point. If the material is fed continuously at a constant rate to the conveyor system at the conveyor system feed point, a substantially continuous layer of material will be deposited on the belts of the conveyor system with a leading edge which moves at a rate determined by the speed of the belts until it reaches the system discharge point, at which time the entire conveyor system has a layer of material thereon of constant depth stretching from the system feed point to the system discharge point. When the feed to the conveyor system is stopped, the trailing edge of the material moves from the system feed point to the system discharge point. When the trailing edge of the material discharged, the belt will be empty.

Sometimes a conveyor system must traverse undulating terrain, and frequently, in these instances, the rises in the ground will be cut and the dips will be filled in an effort to provide a more even path for the conveyor system. It will, of course, be appreciated that the construction cost of the cuts and fills increases the cost of the conveyor system, and the more extensive the construction work to provide a more even path for the conveyor system, the greater will be the added cost to the system.

In almost any conveyor system extending across undulating terrain, there will be in many of the conveyor system segments, when viewed in profile, a curve, or curves, both convex and concave, in the path of the belt of the segment which, for convenience, may be referred to as a vertical curve, or curves.

A serious problem in any conveyor system having concave vertical curves therein is any lifting of the belt in the concave curve, since the lifting will quickly fray or damage the belt. Lifting is generally caused (when the drive motor for the belt is moving the belt) by a tension in the belt upstream of the curve and a load on the belt downstream of the curve. On a downhill segment, where gravity is causing the load to drive the belt, lifting can be caused by the gravity force acting on the load on the downstream side of the vertical concave curve and a braking force exerted by the drive motor acting on the belt on the upstream side of the vertical curve. In either instance (whether the drive motor is pulling or braking the belt) the forces acting on the belt on opposite sides of the curve, act in opposite directions and lift the belt off the idlers in the curve. The forces tending to lift a belt off the idlers in a vertical concave curve will change, depending on the conditions at any given instant, and the conveyor system must be designed to overcome the lifting tendency under the most severe conditions the belt will be subjected to. In cases where the motor must generate power to drive the belt, the most severe condition will occur during acceleration of the belt from a stop, and when the leading edge of the material load is just entering the most downstream vertical concave curve of the segment. At this time, the opposing forces acting on the belt on opposite sides of the downstream curve are high, and the belt in the curve is empty, so the tendency for the belt to lift is great. In cases where the motor acts as a brake to decelerate the belt from the pulling force of gravity and inertia due to the load of material, the most severe condition occurs when a full load is on the belt downstream from the most upstream vertical concave curve of the segment, but no load is in the curve or upstream from the curve.

It has heretofore been recognized that for any given belt, and for any given load on the belt, the tendency of the belt to lift in the curve (under the worst conditions as indicated above) could be reduced by lengthening the vertical curve (that is, by increasing the radius of the curve). If this is done, a longer span of empty belt will lie on the idlers in the curve at any instant, and the increased weight of the belt will resist the forces tending to lift the belt. An empirical equation has been formulated to express the relationship between the tension, or pulling force, on the belt, the smallest radius of the curve which can be utilized without the risk of the belt lifting off the supports in the curve, and the weight of the belt, under the worst condition to which the belt is subjected. This equation is:

$$R = \frac{T}{WB}$$

where
 $R$ = radius of curvature of the belt path in feet,
 $T$ = tension in the belt adjacent the curve (upstream when the motor is supplying the power and downstream when the motor acts as a brake) in pounds, and
 $WB$ = weight in pounds per linear foot of the conveyor belt.

SUMMARY OF THE INVENTION

The present invention relates to a method of feeding material to an overland conveyor system at the feed point therefor which, when followed, will permit the feeding of a greater load of material without causing the belt to lift off the belt at the last downstream vertical curve of a conveyor segment (when the motor is pulling the load) or at the first upstream vertical curve (when the motor is braking the load). Stated another way, the practice of the present invention will permit the conveyance of a given load on a conveyor system segment with smaller vertical curves without lifting of the belt (for a significant saving in construction costs).

In accordance with the present invention, the belts of the segments are started and, initially, material is deposited on the belt of the first segment at a reduced rate (that is, at a rate below the rate, say one-half, the rate for which the conveyor system is designed). Thus, a layer of material one half the normal thickness is deposited on the belt of the first segment, and the leading edge of that layer passes through the upstream vertical curve or curves of the segment and approaches the final downstream vertical concave curve. At this time, the tension T in the belt on the downstream side of the last downstream curve is considerably below the magnitude which would be on the belt if a full load were deposited on the belt from the start. Thus, there is, at this time, a reduced tendency for the belt to lift off the idlers in the curve.

When the leading edge of the material has entered the curve, and preferably when it has reached the downstream end of the curve, the rate of feed of material to the belt is increased. The tension at the downstream end of the curve will continue to increase as the leading edge of the increased load of material moves toward the last curve of the segment since an increasing amount of material is being carried by the belt. But at this time, not only is the weight of the belt holding the belt on the rollers in the curve, but also the weight WM of the reduced layer of material on the belt in the curve. In other words, the tendency of the increased load on the belt before the curve to cause the belt to lift in the curve is effectively offset by the increased weight of the sum of the belt and load (WB + WM) in the curve, tending to hold the belt on the rollers. The load may be fed to the conveyor system in two or more increments.

If the conveyor system has a downhill segment where the motor, or some other means, must act as a brake, the tension in the belt on the upstream side of the first upstream curve of the segment would be high immediately after the trailing edge of a full load passed through the curve. Under these conditions, the force of gravity on the load would tend to lift an empty belt in the curve. Consequently, in accordance with the present invention, when it is desired to terminate transport of material on the belt, the feed to the belt at the feed point is first reduced from the full rate to a reduced rate and is maintained at the reduced rate to establish a reduced layer of material on the belt which is at least as long as the distance from the upstream end of the upstream vertical curve to the discharge end of the conveyor belt to assure that a portion of the reduced layer of material remains in said concave curve as long as any portion of the full load layer remains on the belt. When this is done, the weight of the partial or reduced load on the belt in the curve will offset the tendency of the belt to lift off the idlers after the trailing edge of the full load passes the upstream vertical curve. Thereafter, the feed rate may be reduced further, or terminated completely.

It is therefore one object of the present invention to provide a method of feeding material to a long conveyor system which will permit a greater load to be conveyed without lifting of the belt in the vertical curves.

It is another object of the present invention to provide a method of feeding material to a long conveyor system which will permit the use of curves of shorter radius for a given load without lifting of the belt in the vertical curves.

It is yet another object of the present invention to provide a method of feeding material to a long conveyor system, and, more specifically, a method of terminating said feeding, which will permit a greater load to be carried on downhill segments, and/or will permit the use of curves of shorter radius for a given load without lifting of the belt in the vertical curves.

BRIEF DESCRIPTION OF THE DRAWINGS

FIG. 1 is a diagrammatic plan view of a typical belt conveyor system using the method of the present invention.

FIG. 2 is a diagrammatic elevational view of the belt conveyor system shown in FIG. 1.

FIG. 3 is an enlarged fragmentary elevational view of a portion of the conveyor system shown in FIG. 2 taken in the area of the first vertical concave curve.

FIG. 4 is a section of the conveyor taken along the line 4—4 of FIG. 3.

FIGS. 5 to 8 inclusive are schematic diagrams of the belt conveyor system showing four different conditions of loading material on the inclined, or uphill, portion of the conveyor system of FIG. 2.

FIGS. 9 to 12 inclusive are schematic diagrams of the belt conveyor system showing four different conditions of unloading material on the downhill segment of the conveyor system of FIG. 2.

FIG. 13 is a view in plan of the drive mechanism of FIG. 1 for depositing varying increments of load on the belt in accordance with the present invention.

FIG. 14 is a schematic control circuit for the drive mechanism of FIG. 13.

DESCRIPTION OF THE PREFERRED EMBODIMENT

The method disclosed herein of distributing the material load onto a belt conveyor system in increments may be advantageously used on the typical belt conveyor system 20 shown in FIGS. 1–4. Two conveyor segments 22 and 24 in series are illustrated as traversing undulating terrain GS having rises RI and dips DI. The first conveyor belt segment 22, which must carry material uphill, includes a loading end terminal 26, endless conveyor belt 28 having a carrying, or upper, run 30 and a return run 32, a plurality of spaced carrying run idlers 34 and return run idlers 35 supported on a conveyor frame 36, a discharge end terminal 38, and a gravity (that is, counterweight) takeup 40. The first belt conveyor segment further comprises a loading point S in a horizontal loading section 42, a first concave vertical curve 44, a first inclined section 46, a first convex vertical curve 48, a second concave vertical curve 50, and a second inclined section 52. The belt is trained over a drive pulley V which is driven by motor 53.

The second belt conveyor 24, which carries the material downhill, comprises a loading end terminal 54, endless conveyor belt 56 having a carrying, or upper, run 57 and a return run 58, and a discharge end terminal 60. The conveyor belt 56 is supported on carrying run and return run idlers mounted on a conveyor frame similar to that of the first conveyor 22. The second conveyor 24 further comprises a feed point S in a horizontal loading section 62, a first convex vertical curve 64, a first downhill section 66, a second convex vertical curve 67, a first concave vertical curve 68, a second convex vertical curve 70, a second concave vertical curve 69, a third convex vertical curve 71, and a second downhill section 72. The belt, at end pulley 54, is received over a pulley W which is connected to motor 55. Since the belt is driven by the weight of the load on this downhill segment, the motor 55 acts as a generator which serves to brake the movement and serves to produce power for use by the motor 53 of the uphill conveyor segment 20.

In the preferred embodiment, as shown in FIGS. 1 and 2, material is delivered from a storage bin or hopper 74 to a single variable capacity feeder 76, such as a belt feeder, which controls the feed of the material on to the carrying run 30 at a feed point S in the horizontal loading section 42 of the first conveyor 22. The material is then conveyed and elevated by conveyor 22 to its discharge end terminal 38 where the material drops to the carrying run 57 at feed point S in horizontal loading section 62 of the second conveyor 24. The material is then conveyed and lowered over the downhill section and is discharged over the end terminal 60 for conveyance to some further point of use or for storage.

As shown in FIGS. 1 and 2, the belt feeder 76 is a single variable capacity unit. The capacity of this unit is most frequently adjusted by varying the speed of the feeder belt 78 as with a variable speed drive 80. A suitable drive is a commercially available "LINK-BELT" "P.I.V." infinitely variable ratio chain drive. The speeds of the feeder belt, in accordance with the present invention, are preselected to meter out the material at a particular rate for the desired load, or layer of material, to be deposited on the belt. Thus, for the first increment, or layer, a slow speed corresponding to the desired depth of layer A would be selected (FIG. 5). When the load on the belt is to be increased, the speed of the feed belt is increased to deposit a layer B (FIG. 6) of greater depth than layer A. As a greater load on the belt is desired, the speed of the feed belt is again increased successively to deposit layers of successively greater depth until the final desired load on the belt, that is, the load for which the belt was designed, is reached.

FIGS. 5 to 8 inclusive schematically show several conditions at different times during the loading of material in accordance with the present invention onto a typical uphill conveyor system segment having a belt with a vertical concave curve.

After motor 53 is energized to start the belt, the feed motor is started to begin deposit of layer A of material on the carrying run. After a period of time, layer A will extend from the loading end at feed point S to the beginning of the concave curve 50, with the leading edge LEA at point T, and with the carrying run empty of material from point T to the discharge end terminal 38. It should be noted that the concave curve 50 is the last concave curve (that is, the extreme downstream concave curve of the uphill conveyor segment 22). The likelihood of belt lifting at this curve (as indicated in dotted lines at 28a in FIG. 2) is generally much greater than at an upstream vertical concave curve. This is because the tension in the belt, at the downstream side U of the curve is greater because the load on the upstream side is greater by virtue of the greater length of the load on the belt. With greater tension on one side of the curve, and a greater load on the other side of the curve, the tendency of the belt to lift in the curve will be greater.

Consequently, if the radius of the concave curve 50 is large enough to preclude lifting of the belt, under the conditions just described, the belt will not lift in any upstream curve such as concave curve 44. The material has been fed to the belt at a reduced rate to deposit a reduced layer A of lesser depth than a layer comprising the full design load of the belt. In other words, the initial layer of material deposited on the belt will be some preselected portion of the final desired, or design, load.

At this point, it would be well to consider the conditions which would exist if, initially, the material had been fed to the belt at a full feed rate to deposit a layer comprising the full load for which the conveyor system was designed. At the time the leading edge of the full load layer reached the point T (which is at the beginning, or upstream end, of the most downstream concave curve), the conditions would be the worst insofar as the possibility (for any given radius of vertical curve) of lifting the belt off any of the support idlers 34. With the leading edge of a full load at point T, there is not, as yet, any material on the belt in the vertical concave curve 50 to help hold the belt on the idlers in the curve. At the same time, the length of the full load (and hence the weight), which extends from S to T, is the maximum for the condition where the material is not in the curve. Consequently, the tension in the belt on the downstream side of the curve is greatest for the condition where there is no weight on the belt (other than the weight WB of the belt itself) in the curve.

In contrast to the conditions prevailing when a full load is deposited initially on the belt, the conditions prevailing when the belt is loaded in accordance with the present invention produces, for any given radius of the most downstream vertical curve, much less tendency for the belt to lift off the idlers in the curve. This is because only a reduced, or fractional, portion of the full design load is initially deposited on the belt so that when the leading edge LEA of the reduced layer reaches point T, the weight of the load on the belt is considerably less than if the full load were initially deposited.

The feeding of the material to the belt at a rate to deposit a reduced layer A continues until the leading edge LEA of the layer is at the downstream end of the curve 50, at U, as shown in FIG. 5. At that time, the feed rate is increased to deposit a deeper layer B of material on the belt.

As shown in FIGS. 5 and 6, by the time the greater load B (either a greater fractional load or the full load) is deposited on the belt to increase the load and the tension in the belt, a portion of the layer A of the reduced load is in the curve 50. Hence, the weight of the material in the curve must be considered on addition to the weight of the belt itself. The equation $$R = \frac{T}{WB}$$

previously considered when the material was fed to the belt at a full load feed rate (and assuming the belt empty in the curve when the leading edge of the full load reached the upstream end T of the curve) can be modified as follows $$R = \frac{T}{WB + WM}$$

where WM is the weight of the material per linear foot on the belt in the concave vertical curve when the leading edge of the load B reaches the beginning of the curve T. As the leading edge LEB of the second layer B of material moves toward point T, the first layer A continuously covers the belt in the curve. In the method illustrated in the drawings, one reduced layer A is deposited on the belt, followed after the appropriate time interval, by the full load layer B. Although not shown in the drawings, it should be understood that successively deeper reduced layers of material can be sequentially deposited on the belt until a full load is reached. The feed rate would change, to initiate a deeper layer of material, each time the preceding layer reached the downstream end U of curve 50. As a result of the feed method of the present invention (whether one or more reduced layers are fed to the belt before the full load is fed thereto) a smaller radius R for curve 50 can be employed by virtue of the increased weight on the belt in the curve by the time the greater load B is deposited on the belt.

FIG. 5 shows the length of the reduced layer A on the belt at the time the next deeper load is fed to the belt. FIGS. 6 and 7 show the trailing edge TEA of the reduced layer A and the leading edge LEB of the deeper layer B on the belt simultaneously. If more than two layers of material are used to reach full load, then a third increment would be fed on to the conveyor at point S when the leading edge of layer B is at point U as shown in FIG. 7. This feeding of material at sequentially increasing feed rates in continued until full load is reached, at which time the conveyor system runs continuously with the full load of material as shown in FIG. 8. The number of layers of material used is selected to minimize the required radii of the concave curves in the particular conveyor system being investigated to the extent desired or required.

To illustrate the aforementioned conditions, the following two typical examples are given:

EXAMPLE I

Using Two Layers of Material

A typical overland belt conveyor for coal or similar material may have a profile similar to that shown on the first conveyor 22 of FIG. 2. The horizontal distance of the run from point S to point T is 10,000 feet and the run has a rise in elevation from 0 to 200 feet. The run from point T to point V is a horizontal distance of 1,000 feet with the point V 200 feet higher than the point T. A 48 inches wide conveyor belt was assumed, handling 1800 tons per hour of 50 pound per cubic foot coal at a speed of 666 feet per minute which produces a full material load of 90.0 pounds per linear foot. The weight of suitable conveyor belting is assumed to be 15 pounds per linear foot. It is further assumed that accelerating tensions during starting of the conveyor are suitably controlled to 120 percent of the steady state tension for the conveyor section involved. Then, by using the conventional analytical method of calculating tensions at successive points along the conveyor, which tensions include the frictional effects of moving the belting and the material on the idlers and the gravitational forces of the belt and the material, the tensions at various points and under various loading conditions were determined. This procedure is described in more detail in the Link-Belt Company Catalog 1000 (1967 Edition) on pages 128 to 160. The following data for the tensions T are as follows:

|  | $T_2$ | $T_S$ | $T_T$ | $T_1$ | E |
|---|---|---|---|---|---|
| Running Empty | 5000 | 6850 | 15650 | 16230 | 11230 Lbs. |
| Running Completely Loaded | 5000 | 6850 | 55250 | 57990 | 52990 Lbs. |
| Full Load Only to Pt. T | 5000 | 6850 | 55250 | 55830 | 50830 Lbs. |

Where
$T_2$ = Slack side, or lower run, tension at driving pulley V due to counterweight.
$T_S$ = Tension at point S.
$T_T$ = Tension at point T.
$T_1$ = Tight side, or upper run, tension at driving pulley, Point V
$E$ = Effective tension, $T_1 - T_2$ Tight side tension due to full load of material only from point T to point V $(57990 - 55830) = 2,160$ lbs. Tight side tension due to full load of material only from point S to point T $(55830 - 16230) = 39,600$ lbs.

The total tension at the driving pulley, point V, for starting and accelerating the conveyor with the conveyor fully loaded only to point T was then determined as:

(a) $T_1$ tension for section S to T running loaded = 55,830 lbs.
(b) Additional tension required for starting and accelerating loaded conveyor at 20% effective tension E $(.20 \times 50830)$ = 10,165 lbs.
(c) Total tension (a) + (b) = 65,995 lbs.

As previously mentioned, the acceptable radius of a concave curve is conventionally calculated from the equation, $$\text{Radius} = \frac{\text{Tension}}{W_b}.$$

Thus, with a conventional loading system and the belting fully loaded from point S up to point T, and thus empty within the concave area from point T to V, the required radius of the concave curve which will prevent the belting from lifting from the idlers in the concave curve is:

$$\text{Radius } R = \frac{65995 \text{ lbs.}}{15 \text{ lbs/ft}} = 4,400 \text{ feet}$$

Under the presently disclosed method of increasing the load of material on the conveyor belt in increments, a first increment, or layer A, of 21.8% and a second layer B of 100.0% of full load is assumed. The total tension for starting and accelerating the conveyor when loaded from point S to point T at a reduced load of 21.8% of full load, and empty beyond is:

(d) $T_2$ Slack side tension from counterweight = 5,000 lbs.
(e) 120% effective tension E empty = 1.2 × 11230 = 13,476 lbs.
(f) 120% tight side tension reduced material load = 1.2×.218×39600 = 10,360 lbs.
(g) Total starting tension (d) + (e) + (f) = 28,836 lbs.
∴ Required Radius R = $\frac{T}{WB+WM} = \frac{28836}{15+0}$ = 1,923 feet When the second layer B (100.0% of full load) is added to the belt up to point T and only layer A (21.8% of full load) is on the belt from point T to point V, the total tension for starting and accelerating the conveyor is:

(h) $T_2$ slack side tension from counterweight = 5,000 lbs.
(i) 120% effective tension E loaded to point T = 1.2×50830 = 60,996 lbs.
(j) 120% tight side tension reduced material load (T to V) = 1.2×.218×2160 = 564 lbs.
(k) Total starting tension (h) + (i) + (j) = 66,560 lbs.
∴ Required Radius R = $\frac{T}{WB+WM} = \frac{66560}{15+.218×90}$ = 1,923 feet Therefore using the disclosed incremental method of loading the conveyor, the required radius of the second vertical concave curve 50 of conveyor 22 (FIG. 2) may be reduced from the conventionally required radius of 4400 feet to 1923 feet when two layers of 21.8% and 100.0% of full load of material are sequentially deposited on the conveyor belt at the proper time.

EXAMPLE 2

Using Three Incremental Loads

Assuming the same conveyor as in Example 1, (FIG. 2) but with three incremental loads of:

A = 8.6% = (.086×90) = 7.74 lbs/ft
B = 32.6% = (.326×90) = 29.34 lbs/ft
C = 100.0% = (1.00×90) = 90.00 lbs/ft With increment A (8.6% of full load) on the conveyor belt up to point T and the belt empty from point T to point V, the total tension for starting and accelerating the conveyor under this condition is:

(a) Slack side tension $T_2$ from counterweight = 5,000 lbs.
(b) Accelerating tension for empty conveyor = 1.2×11230 = 13,476 lbs.
(c) Accelerating tension for net material = 1.2×.086×39,600 = 4,087 lbs.
Total starting tension (a) + (b) + (c) = 22,563 lbs.
∴ Required Radius R = $\frac{22563 \text{ lbs.}}{15 \text{ lbs/ft}}$ = 1,504 feet With the conveyor belt loaded with increment B (32.6% of full load) from point S to T and only increment A (8.6% of full load) from point T to point V, the total tension for starting the conveyor under this condition is:

(d) Slack side tension $T_2$ from counterweight = 5,000 lbs.
(e) Accelerating tension for empty conveyor = 1.2×11230 = 13,476 lbs.
(f) Accelerating tension for layer B material to point T = 1.2×.326×39,600 = 15,491 lbs.
(g) Accelerating tension for layer A material from point T to point V = 1.2×.086×2,160 = 223 lbs.
Total starting tension (d) + (e) + (f) + (g) = 34,190 lbs.
∴ Required Radius R = $\frac{34{,}190 \text{ lbs.}}{(15+7.74)\text{lbs/ft}}$ = 1,504 feet With the conveyor belt loaded with a layer C (100% of full load) from point S to point T, and only layer B (32.6% of full load) from point T to point V, the total tension for starting the conveyor under this condition is:

(h) Slack side tension $T_2$ from counterweight = 5,000 lbs.
(i) Accelerating tension for empty conveyor = 1.2×11230 = 13,476 lbs.
(j) Accelerating tension for C layer material to point T = 1.2×39,600 = 47,520 lbs.
(k) Accelerating tension for B layer material from point T to point V = 1.2×326×2160 = 845 lbs.
Total starting tension (h) + (i) + (j) + (k) = 66,841 lbs.
∴ Required Radius R = $\frac{66{,}841 \text{ lbs.}}{(15+.326×90) \text{ lbs/ft}}$ = 1,507 feet Therefore, using the disclosed incremental method of loading the conveyor in three successive layers of 8.6%, 32.6% and 100.0% of full load of material sequentially fed on to the conveyor belt at the proper time, the required radius of the second vertical curve 50 (FIG. 2) may be further reduced from 1923 feet to 1507 feet.

The radius of concave curve 44 located at the loading end of the conveyor are not significantly affected by this method. Material enters the curve before dangerously high tensions build up in the belt from the material load. Any concave curves (not shown) which might be located at the mid point of the conveyor can be constructed with a radius of about half that calculated for the concave curve 50 assumed close to the discharge end of the conveyor.

In long overland belt conveyor systems, downhill sections are frequently required. If downhill sections are present, the entire conveyor system may be regenerative (that is, produce power) by virtue of the force of gravity acting on the material in the downhill sections to drive the conveyor belting. On the other hand, if only a few downhill sections are included in the conveyor system, the power generated by these sections may not drive the entire system, but it will reduce the external power required to drive the system. A brake in the form of a synchronous motor which, when driven by gravity acting on the load, acts as a generator, may be required to control the downhill conveyors. This brake on a regenerative conveyor will generally be located at the feed end of the conveyor segment. Under a regenerative condition, the highest tension in the conveyor belting frequently occurs when unloading the material and while retarding the conveyor with the brake.

As with the previously described conveyor section 22 of FIGS. 1–2, which is generally upwardly inclined and hence is non-regenerative, vertical concave curves may be required in the profile of a downhill conveyor segment. Conveyor section 24 of FIGS. 1–2 illustrates a downhill conveyor segment with concave vertical curves 68, 69, and a loading end drive terminal 54 at its upper end which includes a synchronous squirrel cage motor 55 acting as a brake. The maximum tension in the conveyor belting at the upstream side X of the concave curve 68 determines the minimum radius of the concave curve with which the conveyor belting will not lift off its supporting idlers at the curve.

The use of smaller radii R of vertical concave curves is possible in a downhill conveyor segment if the belt is unloaded in increments by depositing layers of progressively shallower depth until the deposit of material is stopped.

FIGS. 9–12 illustrate four different conditions during unloading and braking of the regenerative conveyor 24 of FIGS. 1–2, using the method of this invention. FIG. 9 shows the conveyor operating with a full load of material comprising the layer B over the entire length of the belting from the loading point S to discharge point Z. It will be noted that the material discharged from conveyor segment 22 is the material fed to conveyor segment 24. For this reason, the discharge rate from segment 22 becomes the feed rate of segment 24.

In a downhill conveyor segment, such as the downhill segment 24, where the force of gravity acting on the load on the belt serves to drive the conveyor, the braking force (which may be a motor, such as motor 55, acting as a generator) acts on the pulley 54 at the upper end of the conveyor segment. Consequently, the force of gravity of the load on the downstream side of a concave vertical curve applies a force to the belt on the downstream side of the concave curve which acts toward the discharge end of the belt. On the other hand, the braking force on the belt upstream of a concave vertical curve acts toward the loading end of the belt, or opposite to the force of the load on the belt downstream of the curve. Thus, at each concave vertical curve in the belt there will be opposing forces on opposite sides of the curve, tending to lift the belt off the support rollers in the curve.

Reference to FIGS. 9 and 12 will show that the opposing forces will be largest at the furthest, or extreme, upstream curve 68. This is because, at any given instant, there will be more belt and material downstream from that curve than any other vertical concave curve in the belt of the segment. Thus, the force of gravity acting on the belt just downstream from the extreme upstream curve will be greater than at any other curve, and the resistance force applied to the belt just upstream from the extreme upstream curve will accordingly also be greater than at any other concave vertical curve in the belt segment. Thus, the tendency for the belt to lift in the extreme upstream concave vertical curve of a downhill conveyor segment is greater than in any other vertical curve of the segment. If lifting of the belt does not occur in the extreme upstream concave vertical curve of a downhill segment, it will not occur in any of the other curves of that segment.

In terminating the feed of material to the continuously moving belt, when further transport of the material is not desired, it is usually desirable to empty the belt so that all material carried thereby is discharged off the discharge end of the belt. If the feed of material to the belt is abruptly terminated, the layer B, comprising the full load, will be the only layer of material on the belt. When the trailing edge TEB of that layer leaves the extreme upstream concave vertical curve, the large force acting on the belt from opposite sides of the curve will tend to lift the belt unless the curve has a very large radius.

This tendency of the belt to lift in the upstream curve will be significantly reduced if some material is on the belt in the curve, to help hold the belt on the curve, as long as the deepest layer B of material remains on the belt downstream from the curve. If successively shallower layers are in the curve as long as the preceding layer remains on the belt, the tendency of the belt to lift off the support rollers in the curve will be minimized. Stated more specifically, when it is desired to terminate the conveyance of material, the feed rate of material to the belt is initially reduced from a rate which deposited full layer B on the belt to a rate which deposits reduced layer A on the belt. The feed rate to deposit layer A on the belt is continued for the time interval it takes the trailing edge TEB of layer B to pass from the upstream end of the upstream curve 68 (point X)) to the discharge end of the segment, point Z. When this is done, a portion of layer A will be in the curve, to help hold the belt on the support rollers in the curve, as long as layer B remains on the belt. At the end of that time interval, the feed rate may be reduced further for the same length of time, and then the feed can be stopped. Alternatively, the feed rate can be stopped at the end of the above described time interval (the time interval during which layer A was deposited on the belt) so that no more material is fed to the belt after the feed of layer A ends.

It has been noted that, on uphill conveyor segments such as segment 22, the time interval that material is to be fed to the continuously running endless belt 28 to form the first reduced layer A of material is the time it takes the leading edge LEA of the layer A to move from loading point S to the downstream end U of the most downstream vertical curve 50. This time interval, which may be identified as T22A, can be mathematically defined as:

$$T22A = \frac{DSU}{R28}$$

where
T22A = time in minutes
DSU = distance in feet between points S and U on segment 22
R28 = rate in feet per minute of movement of belt 28.

If the feed rate is further reduced (but to a value greater than zero), the time interval during which material will be fed at this further reduced rate, (which time interval may be identified as T22X) would be equal to the time interval T22A because the distance DSU and the rate R28 would be the same as when layer A was deposited on the belt.

As has been previously described, for a downhill segment the time interval that material is fed to the continuously running endless belt (such as belt 56 of conveyor segment 24) to form the first reduced layer A of material is the time T24A it takes the trailing edge TEB of layer B to move from the upstream end X of the upstream vertical concave curve 68 to the discharge point Z of the conveyor segment. This time could be expressed mathematically as $$T24A = \frac{DXZ}{R56}$$

where
DXZ is the distance in feet from point X to point Z and
R56 is the speed in feet per minute of the belt 56.
Further reduced feed rates, if used, will be effective an equal time.

If the conveyor system comprises two or more conveyor segments arranged successively in end to end relation, the discharge from each segment will be deposited at the feed point on the belt of the adjacent downstream conveyor segment (except for the extreme downstream conveyor segment). Thus, the rate of feed to the feed point S of the extreme upstream conveyor segment becomes the feed rate for all conveyor segments, and the length and thickness of a layer of material deposited on the extreme upstream conveyor segment will be the same for all conveyor segments because the same layer of material travels from conveyor segment to conveyor segment.

It will be noted that for both uphill and downhill conveyor segments, it is important, in avoiding lifting of the belt, that the layer A extend at least from the feed point S to the downstream end of the extreme downstream concave vertical curve (in uphill segments) or that the layer A extend at least from the upstream end of the upstream concave vertical curve to the discharge point Z. If the layer A on either the uphill or downhill segments extends farther than this span, no harm will be done. The excess length of the layer A will remain in the concave vertical curve longer than required to hold the belt on the supports in the curve.

In order to assure that the belt will lift off none of the concave vertical curves in the entire conveyor system, the feed rate of material, and the time interval the material is fed, is based on the worst condition throughout the conveyor system. The length of a reduced layer, however, is based on the spans described above (from S to U on uphill segments and from X to Z on downhill segments) of the segment (either uphill or downhill) having the longest span (which may be either S to U or X to Z).

There is shown in FIG. 13 drive mechanism to deposit layers of material of different depth on the belt in accordance with the invention disclosed herein. An infinitely variable transmission has side frames SF1 and SF2 in which ball bearings C are mounted for pivotal movement about vertical axes A1, A2, A3 and A4, respectively. The side frames are each pivotally connected at M and N to a fixed cross frame member F, and each threadedly receives a control screw CS at one end. When the screw is rotated in one direction, the two side frames are drawn together at one end and separated at the other end, by pivoting at the cross frame member pivots M and N. When the screw is reversed, the two side frames separate at said one end and draw together at said other end.

A pulley P1 is mounted between the side frames at one end and a pulley P2 is mounted between the side frames at the opposite end. Each pulley has two conical side plates SP1, SP2 with hubs H which are telescopically splined together. Each side plate has a shaft SH extending outwardly therefrom which is received in one of the bearings C, and fixed therein against axial movement relative thereto, as by snap-rings SR.

An endless belt CH is mounted on the pulleys and transmits motion from pulley P2, which is driven by motor 1MTR, to pulley P1, which drives conveyor 78. Positive driving action is assured by metal strips in the belt CH which engage ribs R on the pulley side plates. The control screw CS is rotated, in one direction or the other, by motor 2MTR. When the side plates of one pulley are drawn together (by rotation of the screw in one direction), the side plates of the other pulley separate, thereby changing the speed ratio between the drive member 1MTR and the driven conveyor 78. When the screw is rotated in the opposite direction, the side plates, which were previously drawn together to define a large diameter wheel, separate to constitute a small diameter wheel. At the same time, the small pulley enlarges, thereby changing the speed ratio between the drive and driven members.

A circuit for controlling the variable speed drive is shown in FIG. 14. Initially, the motor 2MTR is energized by pressing push button 2PB until limit switch 1LS (FIG. 13) is operated, thereby establishing a low speed ratio through the drive and conditioning the feed conveyor 78 for a low rate of delivery of material to the belt conveyor. When limit switch 1LS is operated, normally closed contacts 1LS2 and 1LS3 are opened to deenergize the motor.

After the feeder has been conditioned for operation, push button 1PB is depressed to energize relay 1CR through the normally open contacts of limit switch 1LS1, which are closed at this time by virtue of the operation of limit switch 1LS. Relay 1CR is sealed in through its own normally open holding contacts 1CR1. At the same time, motor 1MTR is energized by closure of the normally open contacts 1CR2 of relay 1CR. With the operation of motor 1MTR, slow operation of the feeder conveyor 78 is begun, depositing a reduced layer A of material of shallow depth on the belt.

The energization of relay 1CR causes normally open contacts 1CR3 thereof to close to energize relay 2CR through normally closed contacts 4CR1. On energization of relay 2CR, the normally open, delay-close contacts 2CR1 are conditioned for closing, but will not close until after a lapse of a predetermined time (which is that time it will take the leading edge LEA of layer A of the material to reach point U, FIG. 5). After that lapse of time, contacts 2CR1 close to energize relay 3CR and thereby connect motor 2MTR across the lines by closing the normally open contacts 3CR1 and 3CR2. The energization of motor 2MTR begins rotation of the screw CS (FIG. 16) in a direction to increase the speed ratio of the drive unit.

When relay 3CR is energized to start motor 2MTR, the normally open, delay-close contacts 3CR3 of the relay are conditioned to close after a predetermined time, which is that period of time it takes the feeder to speed up to a rate where it is depositing a thicker layer B of material on the belt than layer A. Layer B may be the full design load of the belt, or it may be of some intermediate thickness, greater than the thickness of layer A but more shallow than the full design load. When that feeder rate is reached, delay contacts 3CR3 close to energize relay 4CR. When relay 4CR is energized, normally closed contacts 4CR1 thereof open to deenergize relay 2CR. When relay 2CR is deenergized, contacts 2CR1 open to release relay 3CR, and contacts 3CR3 open to release relay 4CR. Motor 2MTR is deenergized when relay 3CR is released since normally open contacts 3CR1 and 3CR2 close at that time.

When relay 4CR became energized, normally open contacts 4CR2 thereof closed to energize relay 5CR through normally closed contacts 7CR1. Before relay 4CR is dropped (as previously described) relay 5CR is latched in through its holding contacts 5CR1. When relay 5CR becomes energized, the normally open, delay-close contacts 5CR2 thereof become conditioned for closing after a predetermined period of time, which is equal to the time it takes the leading edge LEB of layer B to reach point U on the belt. After the elapse of time, delay contacts 5CR2 close to energize relay 6CR.

When relay 6CR becomes energized, normally open contacts 6CR1 and 6CR2 thereof close to once again connect motor 2MTR across the lines. The energization of motor 2MTR again speeds up the feed rate so that an additional layer of material (not shown) is deposited on the belt. When relay 6CR became energized to start the motor 2MTR for the second time, the normally open, delay-close contacts 6CR3 of the relay were conditioned for closing. After the motor 2MTR has increased the speed of the feeder to the desired rate to deposit a third layer (not shown) on the belt, the delay contacts 6CR3 close to energize relay 7CR. When relay 7CR is energized, normally closed contacts 7CR1 open to release relay 5CR, which, in turn, results in the deenergization of relay 6CR (as contacts 5CR2 open) and in the deenergization of relay 7CR (as contacts 6CR3 open).

When it is desired to stop the deposit of material on the belt, this is done in steps as was the start of material deposit. The push button switch 3PB is depressed to energize relay 8CR, which is latched in by its own normally open holding contacts 8CR1. At the same time, normally open contacts 8CR2 close to energize relay 9CR. When relay 9CR becomes energized, the motor 2MTR is connected through normally open contacts 9CR1 and 9CR2 in a reverse manner to rotate the drive unit control screw in the reverse direction. As the screw rotates, the speed ratio of the drive decreases to slow the feeder.

When the quantity of material deposited on the belt is decreased to the depth of say layer B (from the greater depth referred to above), the normally open, delay-close contacts 9CR3 (which were conditioned for closing on energization of relay 9CR) close to energize relay 10CR. As relay 10CR becomes energized, the normally open contacts 10CR1 thereof close to energize relay 11CR, which is latched in through its own holding contacts 11CR1. At the same time, the normally closed contacts 11CR2 of that relay open. When contacts 11CR2 open, relay 8CR is released, thereby dropping relay 9CR and relay 10CR. As relay 9CR becomes deenergized, the motor 2MTR stops.

When relay 11CR was energized, the normally open, delay-close, contacts 11CR3 thereof were conditioned for closing. After the trailing edge of the deeper layer of material referred to above (not shown) has reached point X on the belt (FIG. 13), the contacts 11CR3 close to energize relay 12CR and again connect motor 2MTR across the lines in reverse order through normally open contacts 12CR1 and 12CR2.

As relay 12CR becomes energized, the normally open, delay-close contacts 12CR3 thereof become conditioned for operation after a time lapse equal to the time it takes the feed rate to decrease to the rate at which a layer the thickness of layer A is deposited on the belt. After that period of time, delay contacts 12CR3 close to energize relay 13CR, which opens normally closed contacts 13CR1. When contacts 13CR1 open, relay 11CR is released to release relays 12CR and 13CR.

When relay 12CR is released, motor 2MTR is again deenergized to stop the change in feed rate. At this time, a single layer A of material is fed to the belt.

When relay 13CR became energized, the normally open contacts 13CR2 thereof closed to energize relay 14CR through normally closed contacts 15CR2. Relay 14CR1 became latched in through normally open holding contacts 14CR1. At the same time, normally open, delay-close contacts 14CR2 became conditioned to close after a period of time sufficient to allow the trailing edge TEB of the layer B to pass point X. At that time, delay contacts 14CR2 close to energize relay 15CR, thereby opening normally closed contacts 15CR1 and dropping relay 1CR. As relay 1CR becomes deenergized the drive motor 1MTR becomes deenergized to stop the feeder 78. At the same time, normally closed contacts 15CR2 open to deenergize relay 14CR, thereby opening contacts 14CR2 and dropping relay 15CR.

Although the best mode contemplated for carrying out the present invention has been herein shown and described, it will be apparent that modification and variation may be made without departing from what is regarded to be the subject matter of the invention.

What is claimed is:

1. The method of feeding material onto a conveyor belt of substantial length traversing irregular terrain and having a motor to drive the belt, said belt having vertical concave curves because of undulations and dips in the terrain, the method comprising the steps of starting the belt, feeding the material at a feed point to the belt at a reduced rate to deposit on the belt a reduced layer of material having a leading edge, increasing the feed of material to the belt to deposit a full load of material on the belt after the leading edge of the reduced layer of material has entered the extreme downstream vertical curve of the belt.

2. The method of feeding material onto a conveyor belt of substantial length traversing irregular terrain and having a motor to drive the belt, said belt designed to carry a predetermined load and having concave vertical curves because of undulations and dips in the terrain, the method comprising the steps of starting the belt, feeding the material at a feed point to the belt at a rate a fraction of the rate required to deposit said predetermined load to deposit on the belt a first layer of material the depth of which is only a fraction of the depth of a full load, increasing the rate of feed of material to the belt to a higher fraction of the rate required to deposit said predetermined load after the leading edge of said first layer has entered the most downstream vertical curve of the belt to deposit on the belt a second layer of material the depth of which is a greater fraction of said predetermined load than said first layer, and thereafter increasing the rate of deposit of material on the belt after the preceding layer of material has entered the most downstream vertical curve of the belt until the belt is carrying said predetermined load.

3. The method of terminating feed of material being fed at a feed point at a rate to deposit a layer comprising a full load onto a downhill conveyor belt of substantial length traversing irregular terrain and having means to brake the belt, said belt having vertical concave curves because of undulations and dips in the terrain, said belt driven by the force of gravity acting on said full load and being braked by said brake means, the method comprising reducing the feed onto said belt to deposit on the belt a reduced layer of material commencing at the trailing edge of said full load of material maintaining said reduced feed for the time interval required to produce a reduced layer of material of sufficient length to extend from the upstream end of the upstream vertical curve to the discharge end of the conveyor belt to assure that a portion of said reduced layer of material remains in said concave curve as long as any portion of said full load layer remains on the belt, and thereafter stopping the feed of material to the belt.

4. The method of terminating feed of material being fed at a feed point at a rate to deposit a layer comprising a full load onto a downhill conveyor belt of substantial length traversing irregular terrain and having means to brake the belt, said belt having vertical concave curves because of undulations and dips in the terrain, said belt driven by the force of gravity acting on said full load and being braked by said brake means, the method comprising reducing the feed onto said belt to deposit on the belt a first reduced layer of material commencing at the trailing edge of said full load of material maintaining the reduced feed for a time interval to produce a first reduced layer of a length to extend from the upstream end of the upstream concave vertical curve of the belt to the discharge point of the belt to assure that a portion of said first reduced layer of material remains in said concave curve as long as any portion of the full load layer remains on the belt, thereafter further reducing the feed onto said belt to deposit on the belt a second reduced layer of a length substantially equal to the length of said first reduced layer, and thereafter terminating the feed to the belt.

* * * * *